(12) United States Patent
Kemoun

(10) Patent No.: US 7,964,153 B2
(45) Date of Patent: Jun. 21, 2011

(54) REACTOR HAVING A DOWNCOMER PRODUCING IMPROVED GAS-LIQUID SEPARATION AND METHOD OF USE

(75) Inventor: Abdenour Kemoun, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 666 days.

(21) Appl. No.: 12/002,770

(22) Filed: Dec. 19, 2007

(65) Prior Publication Data

US 2009/0158931 A1 Jun. 25, 2009

(51) Int. Cl.
*B01J 8/20* (2006.01)
*B01J 8/22* (2006.01)

(52) U.S. Cl. ........ 422/140; 422/227; 422/228; 422/231; 422/211

(58) Field of Classification Search ................... 422/140, 422/211, 224, 227, 228, 231
See application file for complete search history.

(56) References Cited

U.S. PATENT DOCUMENTS

| | | | |
|---|---|---|---|
| 1,781,872 A * | 11/1930 | Fixman | 208/77 |
| 3,698,876 A * | 10/1972 | Gregoli et al. | 422/230 |
| 4,457,834 A | 7/1984 | Caspers et al. | |
| 4,539,183 A | 9/1985 | Clark et al. | |
| 4,875,995 A | 10/1989 | Van Driesen et al. | |
| 4,886,644 A * | 12/1989 | Chan et al. | 422/140 |
| 4,925,638 A | 5/1990 | Chakravarti et al. | |
| 4,960,571 A | 10/1990 | Bhagat et al. | |
| 4,971,678 A * | 11/1990 | Strickland | 208/162 |
| 5,021,147 A | 6/1991 | Van Driesen et al. | |
| 5,569,434 A * | 10/1996 | Devanathan et al. | 422/140 |
| 5,624,642 A * | 4/1997 | Devanathan et al. | 422/140 |
| 6,183,702 B1 | 2/2001 | Nguyen et al. | |
| 6,278,034 B1 | 8/2001 | Espinoza et al. | |
| 6,454,932 B1 | 9/2002 | Baldassari et al. | |
| 6,726,832 B1 | 4/2004 | Baldassari et al. | |
| 2006/0078483 A1 | 4/2006 | Kemoun et al. | |
| 2007/0140927 A1 | 6/2007 | Reynolds | |

OTHER PUBLICATIONS

U.S. Appl. No. 12/002,769, filed Dec. 19, 2007, inventor Abdenour Kemoun.
U.S. Appl. No. 12/002,772, filed Dec. 19, 2007, inventor Abdenour Kemoun.
U.S. Appl. No. 12/002,771, filed Dec. 19, 2007 'inventor Abdenour Kemoun.

* cited by examiner

*Primary Examiner* — Jennifer A Leung

(57) ABSTRACT

In an upflow reactor for reacting heavy hydrocarbons with hydrogen gas in a liquefied catalyst slurry, that mixture is recirculated down through a downcomer having an upper degassing section which includes a frusto-conical upper surface. The mixture is caused to flow along that surface in a downward helical path, such that heavier components are centrifugally urged outwardly, and lighter components, e.g., gas, migrate inwardly. The gas bubbles can thus coalesce such that small bubbles become bigger bubbles having a greater tendency to rise out of the downcomer. Baffles placed on the upper surface can maximize the residence time of the mixture in the degassing section.

10 Claims, 2 Drawing Sheets

REACTOR HAVING A DOWNCOMER PRODUCING IMPROVED GAS-LIQUID SEPARATION AND METHOD OF USE

FIELD OF ART

Disclosed is a downcomer used, for example, in a reactor for upgrading heavy hydrocarbons.

BACKGROUND

It has been proposed to upgrade heavy hydrocarbons via hydroprocessing in which the hydrocarbons are admixed with an active catalyst composition in liquefied slurry form. As disclosed in U.S. Published Application No. 2007/0140927, the disclosure of which is incorporated herein by reference in its entirety, a feed of heavy hydrocarbons and catalyst slurry is introduced into the lower portion of a reactor chamber, along with hydrogen in a gas phase. Those components travel upwardly within the chamber, enabling the hydrogen to react with, and hydrogenate, the hydrocarbons. Near an upper portion of the chamber, the hydrogenated hydrocarbons are removed as is excess hydrogen gas.

A flow of liquefied slurry and residual hydrogen gas is recirculated within the chamber through a vertically oriented downcomer in the chamber. Such a multi-phase mixture enters an upper end of the downcomer, for example, under the action of a recirculation pump. The mixing which occurs in the downcomer tends to keep the catalyst concentration profile and the temperature profile generally uniform along the height of the reactor.

At or near its upper end the downcomer is typically provided with a degassing section, e.g., in the form of a generally frusto-conical pan which is upwardly open and leads downwardly to a usually cylindrical transport section of the downcomer. Due to the degassing section being of relatively large diameter, travel of the multi-phase mixture therein is slower than the natural ascension velocity of the hydrogen gas bubbles, thereby facilitating escape of the bubbles from the rest of the multi-phase flow.

Since the presence of the bubbles inhibits the downward flow of the mixture, it will be appreciated that promoting the escape of the bubbles from the rest of the multi-phase flow reduces the overall resistance to downward flow of the multi-phase mixture within the downcomer, among other advantages. It would be desirable to yet further reduce the bubble content in the multi-phase mixture.

SUMMARY OF DISCLOSURE

That is accomplished by increasing the residence time of the multi-phase mixture within the degassing section, and by promoting a coalescence of smaller bubbles to form larger bubbles having a faster natural ascension velocity. That is achieved by flowing the multi-phase mixture along a generally frusto-conical surface of the degassing section in a generally downwardly helical direction. Denser components of the mixture are centrifugally urged outwardly away from a center axis of the surface, and less dense components (e.g., gas) bubbles migrate toward the center axis. Small gas bubbles can then coalesce into larger bubbles which have a greater inherent tendency to rise. Baffles preferably placed along the surface to guide the mixture in the helical flow will maximize the residence time of the mixture on the surface and thus maximize the bubble escape.

DETAILED DESCRIPTION

Figure 1:
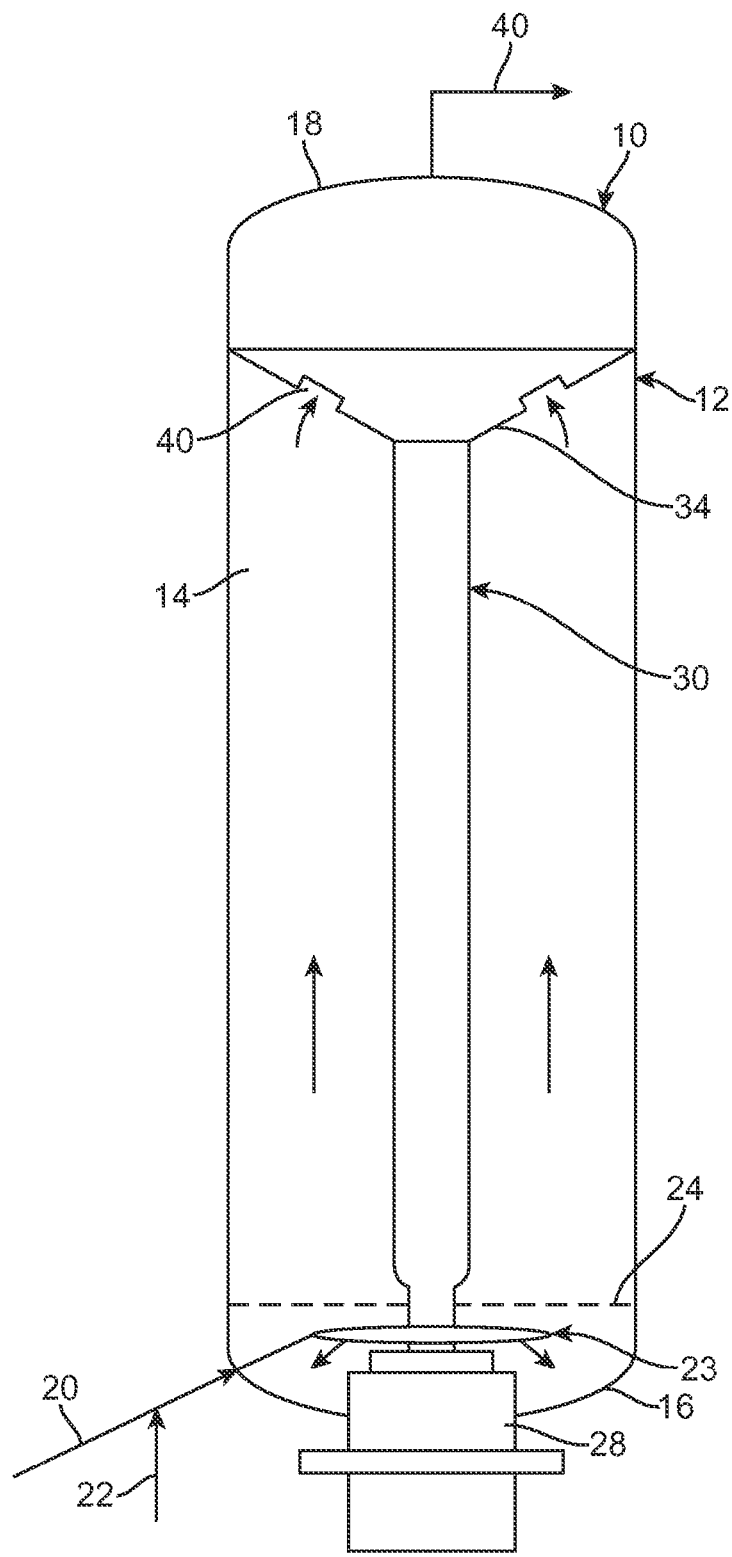
FIG. 1 is a schematic side view of a reactor according to the present disclosure.
Figure 2:
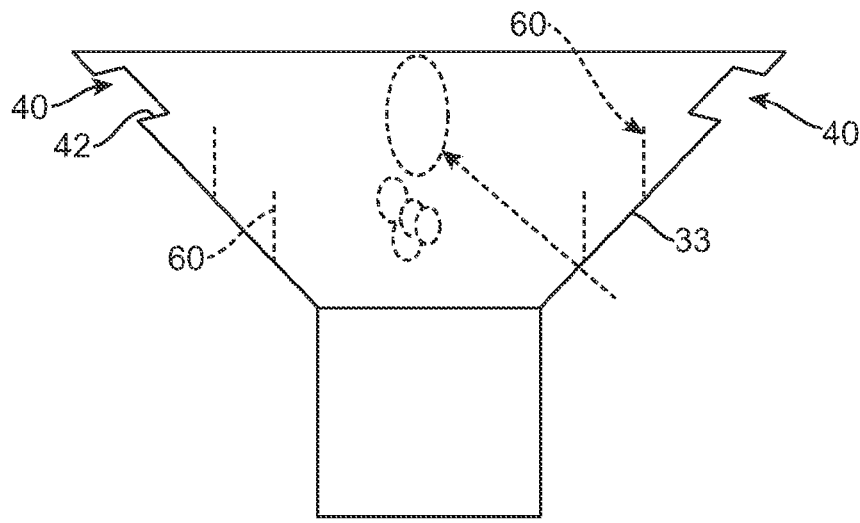
FIG. 2 is a side elevational view of a portion of a downcomer according to the present disclosure.

FIG. 1 is a schematic view of a reactor 10 embodying the present disclosure. The reactor 10 comprises a cylindrical casing 12 forming an inner reaction chamber 14. A lower end piece 16 and a roof 18 are also provided to close off the ends of the chamber. A feed of heavy hydrocarbons and liquefied catalyst slurry is introduced into a lower portion of the chamber 14 through line 20, and hydrogen gas is supplied via line 22. Those components can be introduced into the reaction chamber by way of a distributor ring 23 disposed in a lower portion of the reaction chamber and having discharge nozzles aimed in any desired direction(s). The thus-introduced multi-phase mixture of hydrocarbons, liquefied slurry and hydrogen gas can be distributed by a distributor plate 24 located above the distributor ring.

As the multi-phase mixture rises in the chamber 14, the hydrocarbons react with the hydrogen and are hydrogenated. The hydrogenated hydrocarbons and some unreacted gases are removed at upper portions of the chamber.

Circulation of the multi-phase mixture within the chamber can be induced by a pump 28 which produces a downward flow of the multi-phase mixture through a vertical downcomer 30 disposed in the reactor. The downcomer 30 has open upper and lower ends. The multi-phase mixture, comprising hydrocarbons, liquefied slurry and hydrogen gas, is drawn into the open upper end of the downcomer and discharged into the lower portion of the chamber.

The upper portion of the downcomer 30 is configured to increase the residence time of the mixture therein such that the downward velocity thereof is slower than the natural ascension velocity of the gas bubbles, to promote escape of the bubbles which would otherwise tend to impede the downward flow of the mixture. Thus, an upper portion of the downcomer typically includes a degassing section 34 which feeds into a cylindrical transport section 36 of the downcomer whose diameter is less than a maximum diameter of the degassing section 34.

Conventionally, the multi-phase mixture would be expected to flow into the degassing section over the upper edge thereof. As the mixture descends generally linearly toward the transport section 36, bubbles would escape upwardly and be drawn from the chamber through a line 40 and possibly reintroduced into a lower portion of the chamber.

The escape of bubbles is promoted by further increasing the residence time of the flowing mixture within the degassing section 34 and by accomplishing that in a way which induces smaller bubbles to coalesce and form larger bubbles having an increased natural ascension velocity.

That is achieved, for example, by configuring the degassing section as a pan 33 having a frusto-conical upper surface 39, and conducting the multi-phase mixture along that surface in a downward helical flow which produces centrifugal forces acting on the mixture so as to centrifugally urge heavier (more dense) components of the mixture outwardly away from a center axis A of the surface, whereby lighter (less dense) components, such as the bubbles, are caused to migrate inwardly toward the center axis A.

To produce the helical flow, the pan 33 is provided with inlets 40 that introduce the mixture into the degassing section in a tangential direction. Preferably, the diameter of the upper edge of the pan 33 is equal to or almost equal to the diameter of the reaction chamber to prevent upward leakage of the slurry past the pan and the inlets 40. Each inlet 40 includes a through-hole 42 and a duct 44 surrounding the through-hole 42. The through-hole passes completely through the pan from the underside 46 to the upper surface 39 thereof. The duct 44 is attached to the upper surface and forms a guide passage 50 that constrains the mixture to flow in a tangential direction, i.e., a direction perpendicular to a radial line from the center axis A. This results in a downward helical flow of the mixture toward the transport section 36, which helical flow constitutes a longer overall path of travel as compared to a conventional downward linear path of travel. Also, the centrifugal force which urges the denser components outwardly and allows the less dense components, like bubbles, to migrate inwardly, results in smaller bubbles accumulating near a central vortex region of the flowing mixture where they can coalesce into fewer, larger bubbles that exhibit a greater tendency to rise. As a result, there occurs an improved gas separation.

Figure 4:
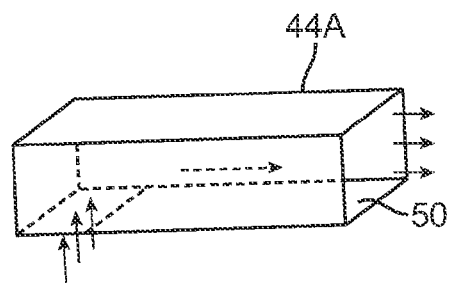
FIG. 4 is a perspective view of a modified duct for guiding a flow onto a degassing section of the downcomer
Figure 3:
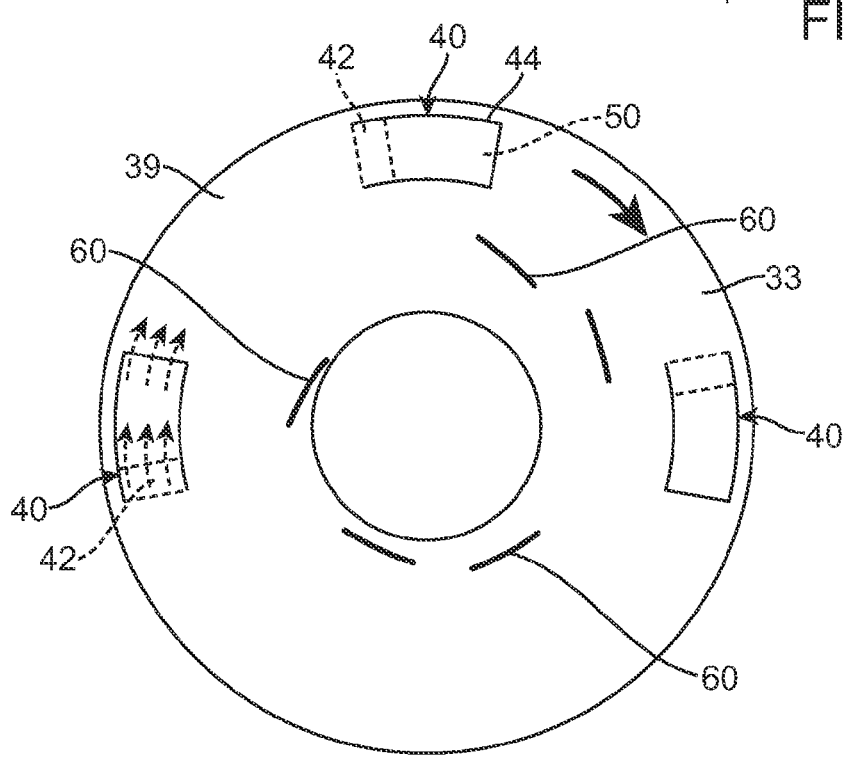
FIG. 3 is a top plan view of the downcomer.

The duct 44 can be curved as shown in FIG. 3, or straight as shown in FIG. 4. Also, the duct can define a linear passage as shown, or it could be shaped as an elbow having a vertical inlet portion and a horizontal outlet portion. A desired ratio of duct length to duct cross-section is in the range of 1 to 10, preferably 3 to 5.

As a further feature, the upper surface 39 of the pan 33 can be provided with baffles 60 downstream of the inlets 40. The baffles are spaced apart along the upper surface 39, for example, in a generally helical pattern, to help constrain the mixture to flow in a helical travel path, and delay the inward collapsing of the flow path to the center axis. Instead, the mixture will flow along the longer helical path at a slower speed, thereby maximizing the residence time of the mixture in the degassing section 34, and thus maximizing the removal of gas bubbles. The number of baffles, as well as their size, shape, location and orientation is not critical as long as a suitable increase in residence time for the mixture is achieved.

It will be appreciated that, in accordance with the present disclosure, there is achieved a greater separation and escape of gas bubbles from the multi-phase mixture, thereby promoting a downward flow of the mixture in the downcomer.

The gas removed via line 40 and/or the slurry exiting the bottom of the downcomer can be recirculated back into the reaction chamber if desired, e.g., through the distributor ring 23 or in another suitable manner.

Many modifications of the exemplary embodiments disclosed herein will readily occur to those of skill in the art. Accordingly, the present disclosure is to be construed as including all structure and methods that fall within the scope of the appended claims.

What is claimed is:

1. A downcomer for use in an upflow reactor for conducting a downward flow of a multi-phase mixture including gas bubbles, comprising:
   a transport section;
   a degassing section disposed at an upper end of the transport section, the degassing section including a pan having a generally frusto-conical upper surface, the pan having a plurality of circumferentially spaced inlets for admitting a flow of a multi-phase mixture, each inlet including a duct attached to the upper surface of the pan extending upward from the inlet and not extending through the pan, oriented to introduce the inflowing mixture onto the upper surface generally tangentially and whereupon the mixture flows in a downward helical direction along the upper surface, causing denser components to be urged outwardly away from a center axis of the surface, and less dense components to migrate inwardly toward the center axis where smaller gas bubbles coalesce into larger bubbles; and
   a plurality of baffles disposed on the upper surface of the pan downstream of the inlet and arranged to guide the flow of the multi-phase mixture in a generally helical direction; and wherein
   each inlet also includes a through-hole extending through the pan and a respective duct arranged around the respective through-hole.

2. The downcomer according to claim 1, wherein the degassing section and the transport section are coaxially arranged.

3. A downcomer for use in an upflow reactor for conducting a downward flow of a multi-phase mixture including gas bubbles, comprising:
   a transport section;
   a degassing section disposed at an upper end of the transport section, the degassing section including a pan having a generally frusto-conical upper surface, the pan having a plurality of circumferentially spaced inlets for admitting a flow of a multi-phase mixture, each inlet including a duct attached to the upper surface of the pan extending upward from the inlet and not extending through the pan, oriented to introduce the inflowing mixture onto the upper surface generally tangentially and whereupon the mixture flows in a downward helical direction along the upper surface, causing denser components to be urged outwardly away from a center axis of the surface, and less dense components to migrate inwardly toward the center axis where smaller gas bubbles coalesce into larger bubbles;
   further including a plurality of baffles disposed on the upper surface of the pan and arranged to guide the flow of the multi-phase mixture in a generally helical direction.

4. An upflow reactor for the hydroprocessing of heavy hydrocarbons, employing gaseous hydrogen and a liquefied slurry containing a catalyst, comprising:
   a casing forming a reaction chamber for conducting an upwardly traveling multi-phase mixture of the heavy hydrocarbons, gaseous hydrogen and liquefied catalyst slurry;
   a vertical downcomer disposed in the casing for recirculating the multi-phase mass, the downcomer including a transport section, and a degassing section disposed at an upper end of the transport section, wherein the degassing section includes a pan having a generally frusto-conical upper surface on which are disposed a plurality of circumferentially spaced inlets for admitting the multi-phase mixture, each inlet including a duct attached to the upper surface of the pan and extending from the inlet and not extending through the pan, oriented to introduce the inflowing mixture onto the upper surface generally tangentially, whereupon the mixture flows in a generally helical downward direction along the upper surface, causing denser components to be centrifugally urged outwardly away from a center axis of the pan and less dense components to migrate inwardly toward the center axis where small bubbles coalesce into large bubbles;
   a plurality of baffles disposed on the upper surface of the pan and arranged to guide the flow of multi-phase mixture in the generally helical direction;
   wherein each inlet includes a through-hole extending through the pan and a respective duct arranged around the respective through-hole.

5. The reactor according to claim 4 wherein the degassing section and the transport section are coaxially arranged.

6. The reactor according to claim 4 wherein the degassing section and the transportation section are coaxial with a center axis of the reaction chamber, an outer diameter of an upper edge of the pan being substantially equal to a diameter of an inner surface of the reaction chamber to resist leakage of multi-phase mixture past the upper edge of the pan.

7. An upflow reactor for the hydroprocessing of heavy hydrocarbons, employing gaseous hydrogen and a liquefied slurry containing a catalyst, comprising:

a casing forming a reaction chamber for conducting an upwardly traveling multi-phase mixture of the heavy hydrocarbons, gaseous hydrogen and liquefied catalyst slurry;

a vertical downcomer disposed in the casing for recirculating the multi-phase mass, the downcomer including a transport section, and a degassing section disposed at an upper end of the transport section, wherein the degassing section includes a pan having a generally frusto-conical upper surface on which are disposed a plurality of circumferentially spaced inlets for admitting the multi-phase mixture, each inlet including a duct attached to the upper surface of the pan and extends from the inlet and not extending through the pan, oriented to introduce the inflowing mixture onto the upper surface generally tangentially, whereupon the mixture flows in a generally helical downward direction along the upper surface, causing denser components to be centrifugally urged outwardly away from a center axis of the pan and less dense components to migrate inwardly toward the center axis where small bubbles coalesce into large bubbles; and a plurality of baffles disposed on the upper surface of the pan and arranged to guide the flow of multi-phase mixture in the helical direction.

8. The reactor according to claim 7, further including a pump for circulating the multi-phase mixture within the reactor.

9. The reactor according to claim 4, further including a distributor ring disposed within the reaction chamber adjacent a lower end thereof for introducing the gas and the catalyst slurry, wherein the distributor ring comprises a plurality of discharge nozzles aiming at desired direction(s).

10. The reactor according to claim 9, further including a distributor plate extending across a lower portion of the reaction chamber above the distributor ring.

* * * * *